US012715961B2

(12) United States Patent
Harding et al.

(10) Patent No.: US 12,715,961 B2
(45) Date of Patent: Aug. 25, 2026

(54) REINFORCED PAEK COMPOSITIONS COMPRISING RECYLCED CARBON FIBERS

(71) Applicant: SYENSQO SPECIALTY POLYMERS USA, LLC, Alpharetta, GA (US)

(72) Inventors: Scott A. Harding, Alpharetta, GA (US); Mohammad Jamal El-Hibri, Atlanta, GA (US)

(73) Assignee: Syensqo Specialty Polymers USA, LLC, Alpharetta, GA (US)

( * ) Notice: Subject to any disclaimer, the term of this patent is extended or adjusted under 35 U.S.C. 154(b) by 733 days.

(21) Appl. No.: 18/003,060

(22) PCT Filed: Jun. 17, 2021

(86) PCT No.: PCT/EP2021/066427
§ 371 (c)(1),
(2) Date: Dec. 22, 2022

(87) PCT Pub. No.: WO2021/259757
PCT Pub. Date: Dec. 30, 2021

(65) Prior Publication Data

US 2023/0250230 A1 Aug. 10, 2023

Related U.S. Application Data

(60) Provisional application No. 63/042,035, filed on Jun. 22, 2020.

(30) Foreign Application Priority Data

Jul. 21, 2020 (EP) .................................... 20186867

(51) Int. Cl.
*C08G 65/40* (2006.01)
*C08G 65/46* (2006.01)
*C08K 3/04* (2006.01)

(52) U.S. Cl.
CPC ......... *C08G 65/4012* (2013.01); *C08G 65/46* (2013.01); *C08K 3/04* (2013.01)

(58) Field of Classification Search
CPC ....... C08G 65/4012; C08G 65/46; C08K 3/04
See application file for complete search history.

(56) References Cited

U.S. PATENT DOCUMENTS

| | | | | |
|---|---|---|---|---|
| 4,792,481 | A | 12/1988 | Beever | |
| 2015/0259531 | A1* | 9/2015 | El-Hibri | C08L 71/00 525/471 |
| 2020/0181360 | A1 | 6/2020 | El-Hibri | |
| 2021/0147625 | A1* | 5/2021 | Louis | C08G 65/40 |

FOREIGN PATENT DOCUMENTS

| | | | |
|---|---|---|---|
| EP | 102158 | A2 | 3/1984 |
| EP | 2454065 | A2 | 5/2012 |
| EP | 2531638 | A2 | 12/2012 |
| EP | 2764147 | A1 | 8/2014 |
| EP | 2850125 | A1 | 3/2015 |
| EP | 2938484 | A2 | 11/2015 |
| EP | 3012297 | A1 | 4/2016 |
| EP | 3132904 | A1 | 2/2017 |
| EP | 3359604 | A1 | 8/2018 |
| JP | 797931 | A | 4/1995 |
| WO | 13026838 | A1 | 2/2013 |
| WO | 13144844 | A1 | 10/2013 |
| WO | 2015042255 | A1 | 3/2015 |
| WO | 2016102330 | A1 | 6/2016 |
| WO | 2018024744 | A1 | 2/2018 |

OTHER PUBLICATIONS

Syensqo catalog, APC (PEKK-FC) catalog, 2025.*
Opposition to European Patent EP 4 168 485 B1 on behalf of Solvay Specialty Polymers USA Application: 21733120.6, mailed Jul. 9, 2025 (54 pages).
Day, R. J., Wood, A. K., & Pang, S. F. (1994). Recyling of APC-2 offcuts. Composites manufacturing, 5(3), 187-193 (7 pages).
Advanced Composite Materials for Aerospace, Solvay (2016).
HexTow AS4D Carbon Fiber, Product Data Sheet, Hexcel (2020).
HexTow AS4 Carbon fiber, Product Data Sheet, Hexcel (2018).
PEKK Thermoplastic Polymer, Technical Data Sheet, Cytec (2012).
Schinner, G., Brandt, J., & Richter, H. (1996). Recycling carbon-fiber-reinforced thermoplastic composites. Journal of Thermoplastic Composite Materials, 9(3), 239-245.
Ho, K. K. C., Shamsuddin, S. R., Riaz, S., Lamorinere, S., Tran, M. Q., Javaid, A., & Bismarck, A. (2011). Wet impregnation as route to undirectional carbon fibre reinforced thermoplastic composites manufacturing. Plastics, rubber and composites, 40(2), 100-107.
Ketaspire PEEK, Design and Processing Guide, Solvay (2016).
VictrexTM PEEK, Properties Guide (2016).
International Search Report issued in Application No. PCT/EP2021/066427 mailed on Aug. 20, 2021 (3 pages).
Written Opinion issued in Application No. PCT/EP2021/066427 mailed on Aug. 20, 2021 (5 pages).
Hui Li et al., "Recycling of carbon fiber-reinforced thermoplastic composite wastes from the aerospace industry", J. Compos. Mater., 2017, 51, p. 1265-1273—Technomic Publishing Co. (9 pages).

(Continued)

*Primary Examiner* — Shane Fang
(74) *Attorney, Agent, or Firm* — Osha Bergman Watanabe & Burton LLP

(57) ABSTRACT

A method for the reuse of PEKK-based carbon fiber reinforced polymer composites is provided. Chips obtained by comminuting the carbon fiber-reinforced PEKK composite material are melt mixed with a virgin poly(aryletherketone) polymer to provide carbon fiber-reinforced poly(aryletherketone) compositions. Molded articles having good mechanical properties can be prepared from the carbon fiber-reinforced poly(aryletherketone) compositions.

18 Claims, No Drawings

(56) References Cited

OTHER PUBLICATIONS

Schinner, et al., "Recycling Carbon-Fiber-Reinforced Thermoplastic Composites", Journal of Thermoplastic Composite Materials, vol. 9, Jul. 1996, 239-245 (7 pages).
Ramakrishna, et al., "Recycling of Carbon Fiber/Peek Composites", Key. Eng. Mater., vol. 137, pp. 1-8, 1997 (8 pages).

* cited by examiner

REINFORCED PAEK COMPOSITIONS COMPRISING RECYLCED CARBON FIBERS

This application is a national stage entry of PCT/EP2021/066427, which claims priority from U.S. provisional application 63/042,035 filed on 22 Jun. 2020 and European patent application 20186867.6 filed on 21 Jul. 2020, the whole content of each of these applications being incorporated herein by reference for all purposes.

TECHNICAL FIELD

The present invention relates to a method for preparing compositions comprising carbon fibers and polyaryletherketone polymers.

BACKGROUND ART

Carbon Fiber Reinforced Polymer Composites (CFRP), i.e. fiber-reinforced composite materials that use carbon fiber as the primary structural component and a polymer, thermoset or thermoplastic, as the matrix component, are lightweight, strong materials used in the manufacturing of numerous products. Their demand has been constantly increasing over the last years, for instance to replace many metallic components within aircraft to reduce weight while maintaining high performance. This has led to the generation of large amounts of residue production and end-of-life products. Unlike metal, waste produced during carbon fiber composite manufacturing, along with end-of-life products, have limited options for reuse. During fabrication of traditional metal components, the resulting scraps are easily recycled and waste is minimized. With carbon fiber composites, the offcuts and trim wastes currently have limited options for reuse and are predominately disposed of in a landfill or by incineration.

These methods have led to increasing environmental awareness to identify a sustainable disposition method and provide a solution to prevent the accumulation of wastes as well as to respond to the continuous increase in demand for virgin carbon fiber.

A need therefore exists to identify methods for the recycling and reuse of waste carbon fiber composite material, thereby helping to avoid the problems of waste disposal which might otherwise arise.

More and more users are starting to realize the potential of carbon fiber composite materials whose polymer matrix consist of engineered thermoplastics polymers, such as poly(aryletherketone) (PAEK) and polyphenylene sulfide (PPS). The thermoplastic polymers provide the manufacturer with faster processing times, increased toughness and a close to infinite shelf life.

In particular, the present inventors have examined the possibility of reusing carbon fiber-reinforced composite materials comprising a thermoplastic matrix, notably a matrix comprising of a poly(aryletherketone) polymer.

Mechanical recycling is one of the available recycling methods for fiber-reinforced composite materials. In general, mechanical recycling is a technique used to reduce the size of scrap composites into smaller pieces, which are then reused.

Mechanical recycling of poly(etheretherketone) based carbon fiber composites (hereinafter CF/PEEK) has been previously disclosed.

Li H., Englund K.; "Recycling of carbon fiber-reinforced thermoplastic composite wastes from the aerospace industry"; J. Compos. Mater., 51, 1265-1273 (2017) and Ramakrishna S., Tan W. K., Teoh S. H., et al.; "Recycling of carbon fiber/PEEK composites"; Key. Eng. Mater., 137, 1-8 (1997) both disclose methods wherein parts of CF/PEEK composites were size-reduced using mechanical means (hammer mill and/or shredder and rotating blade granulator) and then compression moulded into test specimens and subjected to mechanical testing. Both studies showed a decrease in mechanical properties of the parts obtained with the recycled CF/PEEK composites compared to the original composite.

Schinner G, Brandt J and Richter H.; "Recycling carbon-fiber-reinforced thermoplastic composites", J. Thermoplast. Compos. Mater.; 9, 239-245 (1996) discloses a method for the recycling of a CF/PEEK composite material wherein ground CF/PEEK composite was used to reinforce virgin PEEK injection molding material. According to the paper, injection molded pieces obtained using the recycled CF/PEEK material had comparable properties to an equivalent virgin injection molding carbon fiber filled PEEK material.

It has now been found that poly(aryletherketone) compositions comprising recycled composite material having good mechanical properties can be obtained by recycling a poly (ether ketone ketone) based carbon fiber composite material (hereinafter "CF/PEKK"). In particular, it has surprisingly been found that carbon fiber reinforced poly(aryletherketone) compositions having better mechanical properties than the poly(aryletherketone) compositions containing recycled CF/PEEK composite materials of the prior art can be obtained when using recycled CF/PEKK composite materials.

DESCRIPTION OF INVENTION

A first object of the invention is thus a method for making a carbon fiber reinforced poly(aryletherketone) composition by using chips obtained from a CF/PEKK composite material as the source of the carbon fiber.

The expression CF/PEKK composite material is used herein to indicate a poly(ether ketone ketone), PEKK, based carbon fiber composite material.

Object of the invention is thus a method for making a carbon fiber reinforced poly(aryletherketone) composition said method comprising:

- providing chips of CF/PEKK composite material, and
- melt mixing said chips with at least one poly(aryletherketone) polymer different from the PEKK polymer in the CF/PEKK composite material, hereinafter referred to as the "PAEK polymer", and optionally at least one polymer different from the PAEK polymer and from the PEKK polymer in the CF/PEKK composite material, hereinafter referred to as the "polymer (OP)".

The expression "carbon fiber reinforced poly(aryletherketone) composition", hereinafter "reinforced PAEK composition", is used to refer to a composition comprising one or more polymers selected from the group of poly(aryletherketone) polymers and carbon fibers. The carbon fibers in the poly(aryletherketone) composition are discontinuous, chopped carbon fibers.

For the purpose of the present invention, the term "poly (aryletherketone)", used interchangeably with the term "PAEK", is intended to denote any polymer comprising recurring units, wherein more than 50 mol % of said recurring units are recurring units comprising a Ar—C(═O)—Ar' group, where Ar and Ar', equal to or different from each other, are aromatic groups and the mol % is based on the total number of moles of recurring units in the polymer. The recurring units are generally selected from the group consisting of formulae (J-A) to (J-O) herein below:

(J-A)
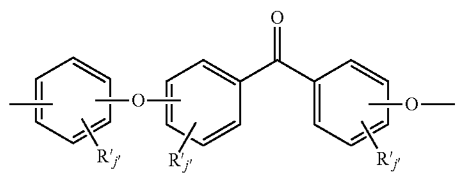
(J-B)
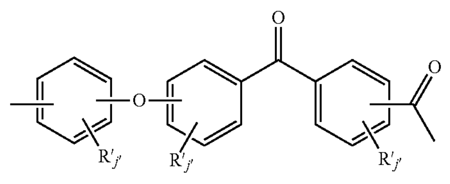
(J-C)
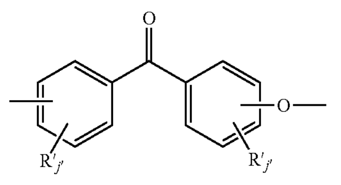
(J-D)
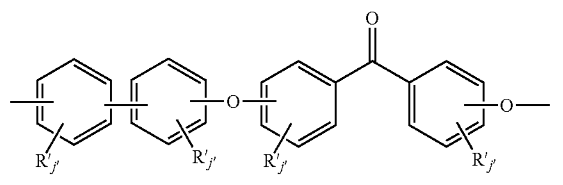
(J-E)
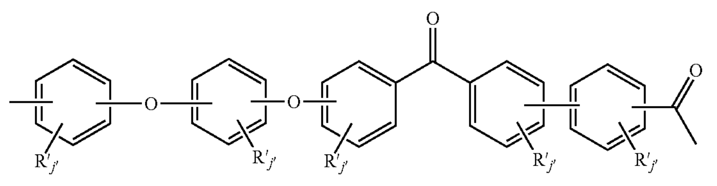
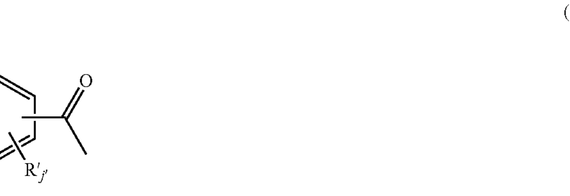
(J-F)
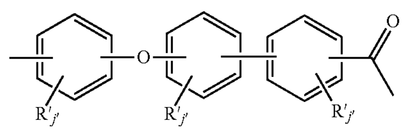
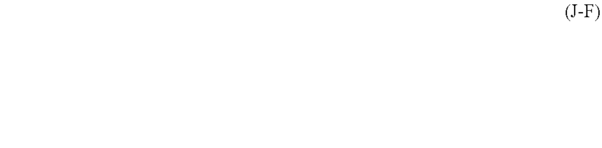
(J-G)
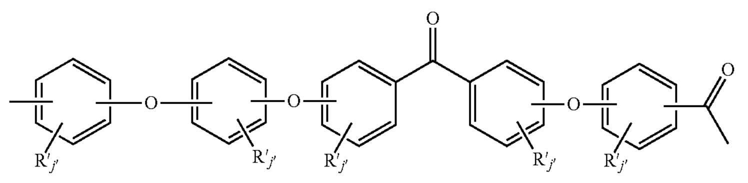
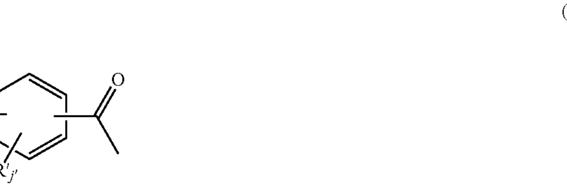
(J-H)
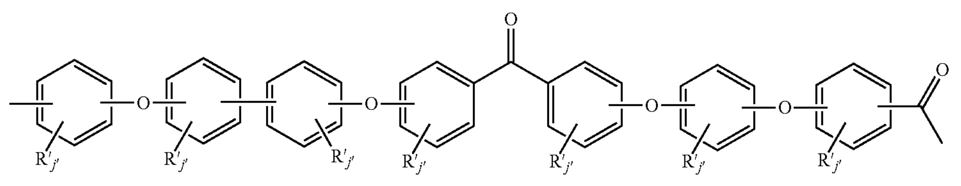
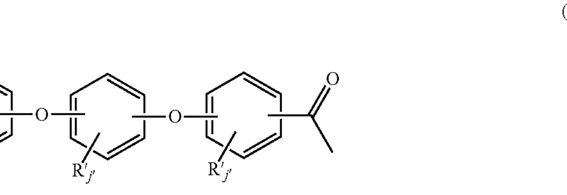
(J-I)
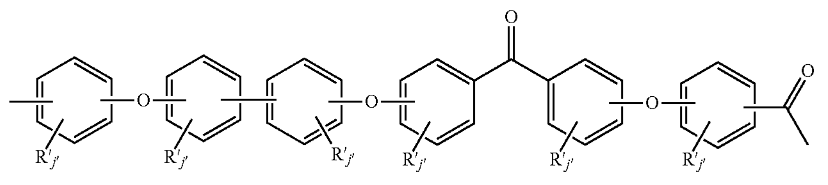
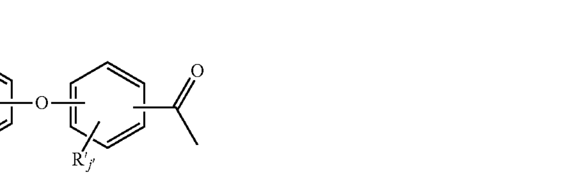
(J-J)
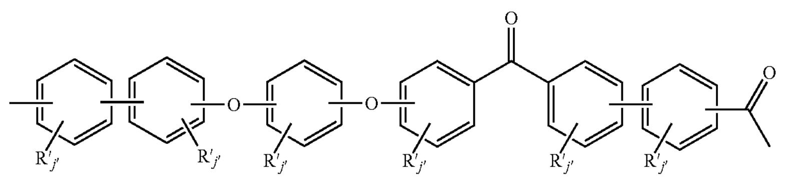
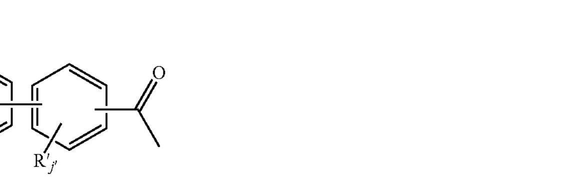

-continued (J-K)

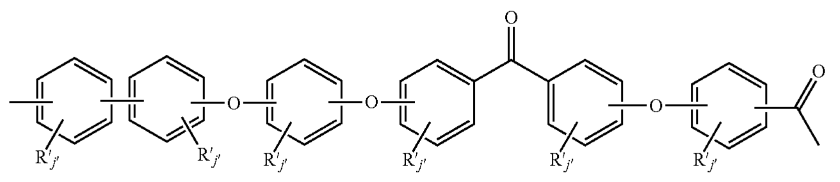

(J-L)

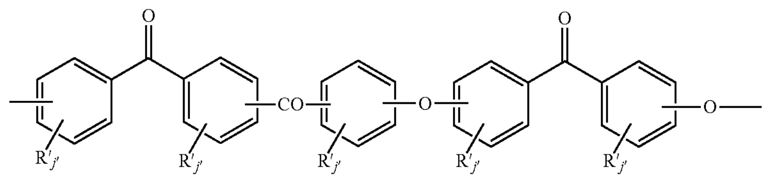

(J-M)

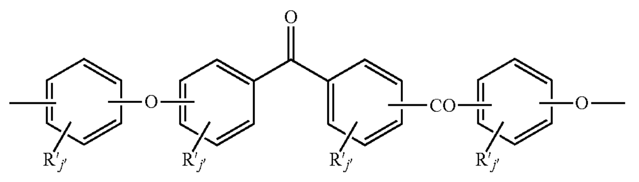

(J-N)

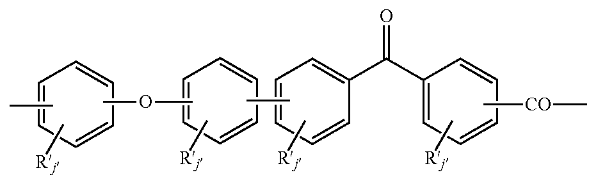

(J-O)

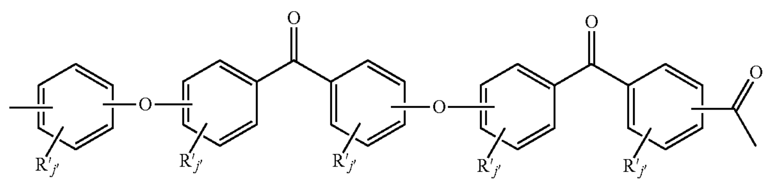

wherein:

each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;

j' is zero or is an integer from 1 to 4.

In recurring units (J-A) to (J-O), the respective phenylene moieties may independently have 1,2-, 1,4- or 1,3-linkages to the other moieties different from R' in the recurring unit. Preferably, said phenylene moieties have 1,3- or 1,4-linkages.

Preferably, the phenylene moieties have no other substituents than those enabling linkages in the main chain of the polymer, that is j' is preferably at each occurrence zero.

Poly(aryletherketones) suitable for the method of the invention have preferably inherent viscosities (IV) in the range of from about 0.5 to about 1.8 dL/g as measured in concentrated sulfuric acid (96% minimum) at 25° C. and a concentration of 0.1% according to ASTM D2857-95. The poly(aryletherketones) have preferably a melt viscosity (measured at 400° C. and a shear rate of 1000 $s^{-1}$) from about 0.05 to 0.65 kPa-s.

Any poly(aryletherketone) polymer different from the PEKK polymer in the CF/PEKK composite may be used in the process.

Notable examples of suitable poly(aryletherketones) are for instance poly(etherketone) (PEK), poly(etheretherketone) (PEEK), poly(etheretherketoneketone) (PEEKK) and poly(etherketoneetherketoneketone) (PEKEKK) polymers.

In one advantageous embodiment, the poly(aryletherketone) polymer is poly(etheretherketone), PEEK, i.e. a homopolymer of recurring units (J-A) wherein j'=0 and all phenylene moieties have 1,4-linkages.

Any PEEK polymer suitable for making carbon fiber filler molding compositions can be used. The PEEK polymer has preferably a melt viscosity (measured at 400° C., 1000 $s^{-1}$) from about 0.05 to 0.50 kPa-s.

The poly(aryletherketone) polymer may alternatively be selected among PEEK-PEoEK copolymers, that is polymers of recurring units (J-A) wherein j'=0 and the phenylene moieties independently have 1,2- and 1,4-linkages. PEoEK polymers typically comprise recurring units of formula (A') and (B') below:

(A')

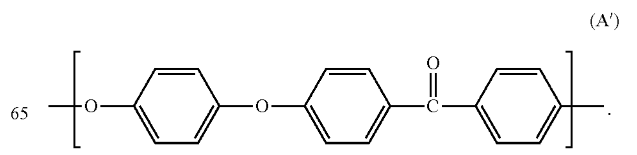

-continued (B')

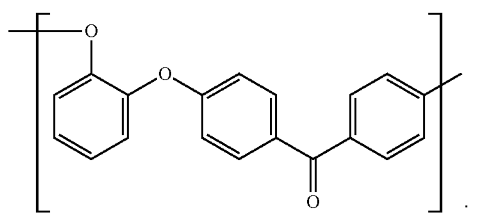

Typically, the PEoEK polymer is selected among those polymers as defined above, wherein the ratio of the total number of moles of recurring units (A') to the total number of moles of recurring units (B') ranges from 95/5 to 70/30, preferably from 90/10 to 72/28, more preferably between 85/15 and 74/26, such as in molar ratios of about 95/5, of about 90/10, of about 85/15, of about 80/20, of about 75/25 or of about 70/30.

The poly(aryletherketone) polymer may also be selected among PEEK-PEDEK copolymers, that is polymers comprising recurring units (j-A) and (J-D) wherein j'=0 and all phenylene moieties have 1,4-linkages. PEEK-PEDEK copolymers typically comprise recurring units of formula (A') and (C') below:

(A')

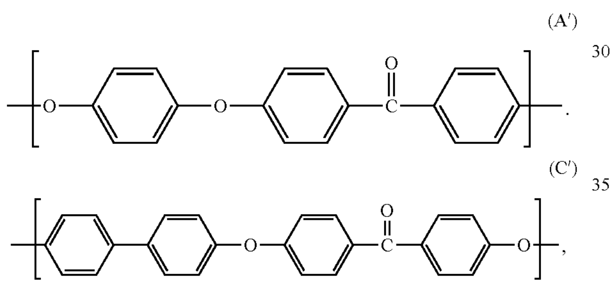

(C')

Repeat units (C') and (A') are present in the PEDEK-PEEK copolymer in a (C')/(A') molar ratio ranging from 55/45 to 80/20, preferably 60/40 to 80/20, more preferably from 60/40 to 75/25.

In one embodiment of the invention the chips of CF/PEKK composite material, are melt mixed with one or more PAEK polymer.

In another embodiment of the invention the chips of CF/PEKK composite material, are melt mixed with one or more PAEK polymer and one or more other polymer OP.

Typically the one or more PAEK polymers are present in an amount greater than the amount of the one or more other polymers OP. The combined weight of the PAEK polymers is generally at least 50 wt % of the total weight of the PAEK polymers and the polymers OP.

Polymer OP may be selected among any polymers which are suitable for melt mixing with poly(aryletherketone) polymers.

In an aspect of said embodiment, polymer OP is selected from the group of poly(arylethersulfone) polymers, hereinafter referred to as "PAES polymers". For the purpose of the present invention, the term "poly(arylethersulfone)" or "PAES polymer", denotes any polymer of which at least 50 mol % of the recurring units are recurring units ($R_{PAES}$) of formula (K), the mol % being based on the total number of moles of recurring units in the polymer:

(K)

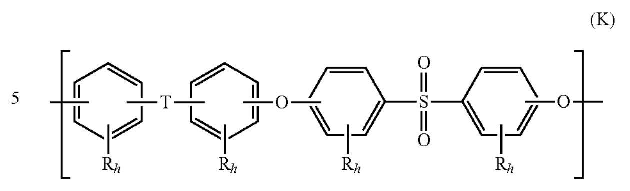

where:

R, at each location, is independently selected from the group consisting of a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium;

h, for each R, is independently zero or an integer ranging from 1 to 4, and

T is selected from the group consisting of a bond, a sulfone group [—S(═O)$_2$-], and a group —C($R_j$)($R_k$)—, where $R_j$ and $R_k$, equal to or different from each other, are selected from a hydrogen, a halogen, an alkyl, an alkenyl, an alkynyl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium.

T is preferably a bond, a sulfone group or a group —C($R_j$)($R_k$)— in which $R_j$ and $R_k$ are preferably methyl groups.

Notable examples of suitable poly(arylethersulfones) are for instance polysulfone (PSU), polyphenylsulfone (PPSU) or polyethersulfone (PES) polymers.

The term polysulfone (PSU) denotes any polymer comprising at least 50 mol % of recurring units of formula (L), the mol % being based on the total number of moles in the polymer:

(L)

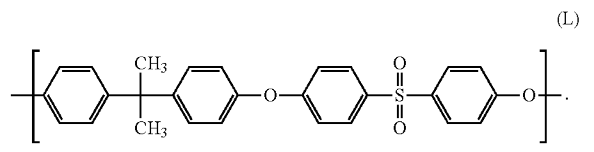

The term polyphenylsulfone (PPSU), denotes any polymer comprising at least 50 mol % of recurring units of formula (M), the mol % being based on the total number of moles of recurring units in the polymer:

(M)

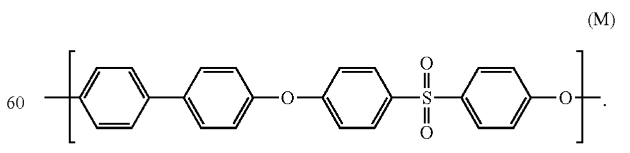

The term polyethersulfone (PES) denotes any polymer comprising at least 50 mol % of recurring units of formula (0), the mol % being based on the total number of moles of recurring units in the polymer:

(O)

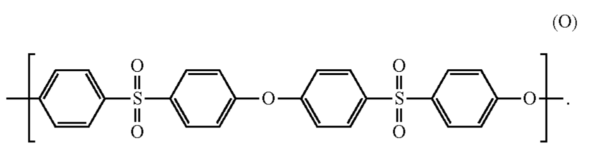

In an aspect of the invention the chips of CF/PEKK composite material, are melt mixed with a composition comprising one or more PAEK polymer, polyphenylsulfone (PPSU) and polyethersulfone (PES).

The composition preferably comprises PEEK, polyphenylsulfone (PPSU) and polyethersulfone (PES). The composition may comprise 50 to 60 wt % PEEK, 30 to 40 wt % polyethersulfone (PES) and 5 to 10 wt % polyphenylsulfone (PPSU), the wt % being based on the total weight of the composition.

For the avoidance of doubt, the terms "poly(ether ketone ketone)" or "PEKK" are intended to denote any polymer comprising at least 50% by moles of recurring units (J-B) wherein j'=0 and the respective phenylene moieties may independently have 1,2-, 1,4- or 1,3-linkages, preferably, said phenylene moieties have 1,3- or 1,4-linkages.

PEKK polymers may be characterised by the ratio between 1,3- and 1,4 phenylene linkages in the polymer. In particular, they may differ in the ratio between recurring units of formula (M') and (P') below:

(P')

(M')

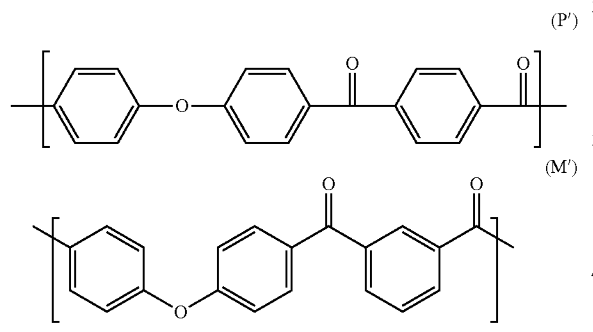

Typically, the PEKK polymer in the CF/PEKK composite material is selected among those PEKK polymers as defined above, wherein the ratio of the total number of moles of recurring units (P') to the total number of moles of recurring units (M') ("(P')/(M') ratio" or "T/I ratio") ranges from 55/45 to 75/25, preferably from 60/40 to 80/20, more preferably from 62/38 to 75/25.

When the poly(aryletherketone) is a PEKK polymer, it will generally be characterised by a different T/I ratio with respect to the PEKK polymer in the CF/PEKK composite material.

In the first step of the method, chips of CF/PEKK composite material are provided.

The chips of CF/PEKK composite material are typically obtained by comminuting an article made of CF/PEKK composite material.

Thus the inventive method comprises the steps of:

providing an article made of CF/PEKK composite material;

comminuting said article to obtain chips of CF/PEKK composite material; and melt mixing said chips with at least one poly(aryletherketone) polymer different from the PEKK in the CF/PEKK composite material.

The article made of CF/PEKK composite material can be either a waste from the composite manufacturing process or a prepreg unitap production residue, such as offcuts and trim wastes or product that is off on thickness specification or it can be an end-of-life product, to mention a few examples.

In one embodiment of the inventive method the article consists of edge trims or scrap waste generated during the manufacture of the CF/PEKK composite material.

In one preferred aspect of said embodiment, the CF/PEKK composite material comprises a unidirectional continuous fiber reinforced tape made by a melt impregnation process. Melt impregnation process generally comprises drawing a plurality of continuous filaments through a melted precursor composition that comprises the polymer. The precursor composition may additionally comprise specific ingredients such as plasticizers and processing aids, which facilitate impregnation. Melt impregnation processes include direct melt and aromatic polymer composite ("APC") processes, such as the one described in EP 102158.

Advantageously, the CF/PEKK composite material is obtained by means of a melt impregnation process in the presence of diphenylsulfone as plasticizer. The residual amount of diphenylsulfone in the CF/PEKK composite material is from 0.01 wt % to 1.00 wt % with respect to the total weight of the CF/PEKK composite material. The amount of diphenylsulfone may be from 0.03 wt % to 0.90 wt %, even from 0.04 to 0.85 wt %, preferably from 0.04 to 0.80 wt %.

Without being bound by theory it is believed that the presence of diphenylsulfone in the CF/PEKK chips improves the binding of the carbon fibers with the poly (aryletherketone) polymer in the composition.

In another embodiment the composite material comprises a unidirectional continuous fiber reinforced tape made by a slurry process. An exemplary slurry process can be found, for example, in U.S. Pat. No. 4,792,481.

The CF/PEKK composite material typically comprises from 20 to 80 wt %, more typically from 40 to 80 wt %, of carbon fibers. The CF/PEKK composite material typically comprises from 80 to 20 wt %, more typically 60 to 20 wt %, of the PEKK polymer with respect to the weight of the composite.

The step of comminuting, that is chopping or cutting, the CF/PEKK composite article into chips is typically performed using mechanical means. Any mechanical means known in the art can be used, such as blades, for example die-cutting blades or roller blades, a die-cutting lattice, a shredder or any other suitable mean. A laser may also be used for the comminuting of the CF/PEKK article into chips.

The length of the chips to which the CF/PEKK composite article is cut is preferably in the range from 3 to 50 mm, especially in the range from 5 to 20 mm. Chip length should also be selected so as to be commensurate with the feeding capability of the machine used to mix the chips of the CF/PEKK composite material to the at least one poly (aryletherketone) polymer.

As the chips of the CF/PEKK composite material are melt mixed with the at least one poly(aryletherketone) polymer, the individual chips disintegrate into individual fibers, which then become mixed into the polymer melt. The properties of the reinforced PAEK composition thus obtained correspond to the properties of a chopped strand reinforced polymer.

Any known melt-mixing process that is suitable for preparing thermoplastic compositions can be used for the manufacture of the reinforced PAEK composition. Such a process is typically carried out by heating the thermoplastic polymer above the melting temperature of the polymer thereby forming a melt of the thermoplastic polymer.

The process for the preparation of the reinforced PAEK composition can be carried out in a melt mixing apparatus. Any melt mixing apparatus known to the one skilled in the art of preparing polymer compositions by melt mixing can be used. Suitable melt-mixing apparatus are, for example, kneaders, Banbury mixers, single-screw extruders, twin-screw extruders and injection molding machines.

Adding the chips into a polymer melt provides more homogeneous commixing of the melt with the chips and hence a more uniform distribution of the resultant individual fibers in the polymer melt.

When the melt mixing is performed using an extruder, multiple screw extruders, for example twin screw extruders, can be used. It may be advantageous to use twin screw extruders, since they have a better mixing effect in particular compared with single screw extruders.

The proportion of chips of CF/PEKK composite material melt mixed with the at least one poly(aryletherketone) and optionally the at least one other polymer OP is such that the amount of carbon fiber in the final reinforced PAEK composition is from 5 to 60 wt % with respect to the total weight of the composition. Typically the proportion of chips is such that the amount of carbon fiber in the reinforced PAEK composition is from 5 to 60 wt %, even from 5 to 50 wt %, preferably from 10 to 50 wt %, even from 10 to 45 wt % with respect to the total weight of the composition.

The reinforced PAEK composition obtained by the method of the present invention is preferably in the form of a pellet material. In addition to a pellet material, however, the reinforced PAEK composition can also take the form of sheets or extrudates. When the reinforced PAEK composition is in the form of a pellet, this pellet is produced in the usual manner by the polymer melt being forced through a pelletizing die and chopped into pellets by a pelletizing knife.

One possible way to do this is first to produce a polymer extrudate which is cooled down then chopped into pellets. Alternatively, and conventionally, the polymer forced through the pelletizing die is directly face cut. This cutting can take place in air, in which case the cut pellets preferably fall into a cooling liquid and solidify. Water is an example of a suitable cooling liquid. Alternatively, underwater pelletization is also possible, in which case the polymer melt is forced through the pelletizing die into a cooling liquid and directly face cut into pellets. In either case, the pellets are exported with the cooling liquid, then freed of the cooling liquid and dried.

The length of the carbon fibers in the reinforced PAEK composition depends, firstly, on the shearing of the fibers in the melt mixing machine and, secondly, on the dimensioning of the pellet material cut out of the polymer melt. Maximum fiber length corresponds to the maximum longitudinal extent of an individual pellet. If longer fibers are desired, it is not only necessary to cut chips having a larger edge length but also to produce a larger pellet. The pellet is preferably cylindrical and its largest extent is typically the height of the cylinder.

Alternatively, however, it is also possible to choose a larger diameter and a lower height. But since the fibers are caused by the feed of the polymer melt to become aligned in a substantially parallel arrangement in the axial direction relative to the axis of the holes in the pelletizing die, it is typically the axial extent of the pellet which determines the maximum attainable fiber length.

Typically the carbon fibers in the reinforced PAEK composition have an average length ranging from 0.05 to 10 mm, from 0.05 to 6 mm, even from 0.1 to 5 mm, more typically from 0.1 to 3 mm.

The reinforced PAEK composition can be further processed into an article using any suitable melt-processing technique including, but not limited to, extrusion molding, injection molding, and compression molding.

According to exemplary embodiments, reinforced PAEK compositions obtained by the method of the invention in which chips of CF/PEKK composite material, are melt mixed with one or more PAEK polymer alone may be characterised by at least one of the following properties:

tensile strength equal to or greater than 255 GPa as measured on ASTM Type I dog-bone test specimens (16.5 cm long, 1.3 cm wide and 0.32 cm thick) according to ASTM D638 (test speed: 0.5 cm/min);

flexural strength equal to or greater than 370 MPa as measured on bars (12.7 cm long, 1.3 cm wide and 0.32 cm thick) according to ASTM D790 (test speed: 0.13 cm/min, 5.1 cm span).

According to further exemplary embodiments, reinforced PAEK compositions obtained by the method of the invention in which chips of CF/PEKK composite material, are melt mixed with a composition comprising PEEK, polyphenylsulfone (PPSU) and polyethersulfone (PES) may be characterised by at least one of the following properties:

tensile strength equal to or greater than 160 GPa as measured on ASTM Type I dog-bone test specimens (16.5 cm long, 1.3 cm wide and 0.32 cm thick) according to ASTM D638 (test speed: 0.5 cm/min);

flexural strength equal to or greater than 235 MPa as measured on bars (12.7 cm long, 1.3 cm wide and 0.32 cm thick) according to ASTM D790 (test speed: 0.13 cm/min, 5.1 cm span).

Thus the present invention allows the production of articles made of reinforced PAEK materials by using a waste CF/PEKK composite material as a raw material. The reinforced PAEK composition is characterised by good mechanical properties which make it suitable for the manufacture of high added value articles.

The reinforced PAEK composition can be used in the industry for the manufacture of a variety of finished articles. Accordingly, a further object of the present invention is an article made from, or comprising, the reinforced PAEK composition. Articles that can be manufactured from the reinforced PAEK composition are in particular those requiring high levels of strength, stiffness and toughness.

Advantageously, the article may be an injection molded article or an extrusion molded article.

Non-limiting examples of articles include valve seats/seals, pump wear rings, gears and sliding vanes or medical device fixtures, turbine and/or turbine housings for appliances.

Should the disclosure of any patents, patent applications, and publications which are incorporated herein by reference conflict with the description of the present application to the extent that it may render a term unclear, the present description shall take precedence.

The invention will be now described in more detail with reference to the following examples whose purpose is merely illustrative and not limitative of the scope of the invention.

EXAMPLES

Materials

CF/PEKK: APC (PEKK) carbon prepreg commercially available from Cytec Engineered Materials/Cytec Industries Inc., Woodland Park N.J.; comprising 64 to 67 wt % carbon fiber HexTow® AS4D and 33 to 36 wt % PEKK resin (T/I ratio=72:28; Tg=155° C., Tm=335° C.)

CF/PEEK: APC-2 (PEEK) commercially available from Cytec Engineered Materials/Cytec Industries Inc., Woodland Park N.J; comprising KT880: KetaSpire® KT-880P PEEK (commercially available from Solvay Specialty Polymers USA, L.L.C), having specification melt viscosity ranges of 0.12-0.18 kPa-s (measured by a capillary rheometer at a temperature of 400° C. and a shear rate of 1000 $s^{-1}$).

KT890: KetaSpire® KT-890P PEEK (commercially available from Solvay Specialty Polymers USA, L.L.C), having specification melt viscosity ranges of 0.07 to 0.11 kPa-s (measured by a capillary rheometer at a temperature of 400° C. and a shear rate of 1000 $s^{-1}$).

PPSU: RADEL® R 5900 PPSU [MFR (365° C./5 kg) is in the range 26 to 36 g/10 min] is a polyphenylsulfone (PPSU) homopolymer from Solvay Specialty Polymers USA, L.L.C.

PES: Veradel® A-702 NT PES [MFR (380° C./2.16 kg) is in the range 65 to 85 g/10 min] is a polyethersulfone (PESU) homopolymer from Solvay Specialty Polymers USA, L.L.C.

Chopped CF: Sigrafil® C30 S006 APS from SGL Carbon Fibers, Ltd.

PEPQ: Hostanox® PEP-Q®, an aromatic organic phosphonite melt thermal stabilizer available from Clariant Zinc oxide: grade Aktiv® available from Lanxess Corp.

General Procedure

The tapes of CF/PEKK or CF/PEEK material were comminuted using a shredder into chips 5 to 7 mm long and 3 to 7 mm wide.

The chips were melt mixed with virgin PEEK resin (KT880 or KT890) or with a composition comprising PEEK (KT890), PPSU and PES using a ZSK-26 Coperion twin-screw extruder (12 barrel sections, 26 mm diameter, 48 L/D ratio) and injection molded into test bars for further testing.

Comparative specimens were prepared by compounding the same virgin PEEK resin or PEEK, PPSU and PES composition, with standard chopped carbon fibers to obtain compositions containing the same weight % of carbon fibers which were then injection molded into ASTM test bars.

Tensile properties were measured on ASTM Type I dog-bone test specimens (16.5 cm long, 1.3 cm wide and 0.32 cm thick) according to ASTM D638 (test speed: 0.5 cm/min).

Flexural properties were measured on bars (12.7 cm long, 1.3 cm wide and 0.32 cm thick) according to ASTM D790 (test speed: 0.13 cm/min, 5.1 cm span).

Izod impact resistance (notched) and Izod impact resistance (unnotched) were determined according ASTM test methods D256 and D4812, respectively using injection molded plaques (10.16 cm×10.16 cm and 0.32 cm thick). The results of the tests are reported in Table 1.

The data in Table 1 show that the reinforced PAEK compositions obtained using chips of CF/PEKK composite materials as source of carbon fibers (Ex. 1, Ex. 2 and Ex. 3) have good mechanical properties compared to reinforced PAEK compositions obtained from virgin PAEK and virgin carbon fibers (C. Ex. 1, and C. Ex. 3 and C. Ex. 4)

The data also unexpectedly show that the tensile and flexural strengths of the reinforced PAEK compositions obtained using chips of CF/PEKK composite material (Ex. 1) are higher than those of PAEK compositions obtained using chips of CF/PEEK composite material (C. Ex 2).

Good mechanical properties are also obtained when the reinforced PAEK composition includes polymers other than PAEK polymers and in particular PES and PPSU polymers. The reinforced composition of Ex. 5 exhibits higher tensile and flexural strength as well as higher impact strength with respect to the composition of C. Ex. 5 prepared using virgin carbon fibers.

TABLE 1

| | Ex. 1 | C. Ex. 1 | C. Ex. 2 | Ex. 2 | C. Ex. 3 | C. Ex. 4 | Ex. 3 | Ex. 4 | C. Ex. 5 | Ex. 5 |
|---|---|---|---|---|---|---|---|---|---|---|
| KT-880 (% wt) | 53 | 70 | 53 | 38 | 60 | | | | | |
| KT-890 (% wt) | | | | | | 70 | 55 | 39 | 48 | 45 |
| PES (% wt) | | | | | | | | | 35 | 33 |
| PPSU (% wt) | | | | | | | | | 6 | 6 |
| ZnO (% wt) | | | | | | | | | 0.1 | 0.1 |
| PEPQ (% wt) | | | | | | | | | 0.1 | 0.1 |
| CF/PEKK (% wt) | 47 | | | 62 | | | 46 | 61 | | 16 |
| CF/PEEK (% wt) | | | 47 | | | | | | | |
| Sigrafil C30 S006 APS (% wt) | | 30 | | | 40 | 30 | | | 10 | |
| CF loading in final composition (% wt) | 29 | 30 | 31 | 40 | 40 | 29 | 30 | 39 | 10 | 10 |
| Tensile Strength (MPa) | 256 | 251 | 237 | 261 | 250 | 241 | 262 | 271 | 158 | 175 |
| Tensile Modulus (GPa) | 26 | 25 | 24 | 33 | 29 | 24 | 26 | 34 | 11 | 11 |
| Tensile Elongation at Break (%) | 1.7 | 1.9 | 1. 7 | 1.5 | 1.7 | 1.8 | 1.7 | 1.4 | 2.2 | 2.7 |
| Flexural Strength (MPa) | 372 | 365 | 348 | 379 | 368 | 345 | 383 | 396 | 229 | 269 |
| Flexural Modulus (GPa) | 22 | 22 | 22 | 31 | 26 | 21 | 24 | 31 | 10 | 10 |
| Flexural Strain at Break (%) | 2.0 | 2.1 | 1.9 | 1.6 | 1.8 | 2.0 | 2.0 | 1.6 | 2.9 | 3.6 |

TABLE 1-continued

| | Ex. 1 | C. Ex. 1 | C. Ex. 2 | Ex. 2 | C. Ex. 3 | C. Ex. 4 | Ex. 3 | Ex. 4 | C. Ex. 5 | Ex. 5 |
|---|---|---|---|---|---|---|---|---|---|---|
| Notched Izod (J/m) | | | | | | 64 | 76 | 73 | 41 | 53 |
| No Notch Izod (J/m) | | | | | | 705 | 678 | 694 | 550 | 566 |

The invention claimed is:

1. A method for making a carbon fiber reinforced poly(aryletherketone) composition said method comprising:
   providing chips of CF/PEKK composite material; and
   melt mixing said chips with at least one poly(aryletherketone) polymer different from the PEKK in the CF/PEKK composite material, wherein the CF/PEKK composite material comprises a unidirectional continuous fiber reinforced tape made by a melt impregnation process or a slurry process.

2. The method of claim 1 comprising the steps of:
   providing an article made of CF/PEKK composite material;
   comminuting said article to obtain chips of CF/PEKK composite material; and
   melt mixing said chips with at least one poly(aryletherketone) polymer different from the PEKK in the CF/PEKK composite material.

3. The method of claim 1 wherein the CF/PEKK composite material contains from 0.01 wt % to 1.00 wt % of diphenylsulfone with respect to the total weight of CF/PEKK composite material.

4. The method of claim 1 wherein the amount by weight of chips of CF/PEKK composite material melt mixed with the at least one poly(aryletherketone) is such that the amount of carbon fiber in the carbon fiber reinforced poly(aryletherketone) composition is from 5 to 60 wt % with respect to the total weight of the composition.

5. The method of claim 1 wherein melt mixing is performed in an extruder.

6. The method of claim 1 in which mechanical means are used for comminuting said article made of CF/PEKK composite material into chips.

7. The method of claim 1 wherein the at least one poly(aryletherketone) is poly(etheretherketone).

8. The method of claim 7 wherein the poly(etheretherketone) has a melt viscosity (measured at 400° C., 1000 $s^{-1}$) from about 0.05 to 0.50 kPa-s.

9. The method of claim 1 wherein the chips of CF/PEKK composite material are melt mixed with at least one poly(aryletherketone) and at least one polymer different from the least one poly(aryletherketone) polymer and from the PEKK polymer in the CF/PEKK composite material.

10. The method of claim 9 wherein the at least one polymer different from the poly(aryletherketone) polymer and from the PEKK polymer in the CF/PEKK composite material is selected from the group of poly(arylethersulfone) polymers.

11. The method of claim 1 further comprising the step of molding the carbon fiber reinforced poly(aryletherketone) composition into an article.

12. The method of claim 1 wherein the carbon fiber reinforced poly(aryletherketone) composition is in the form of pellets.

13. A carbon fiber reinforced poly(aryletherketone) composition comprising PEKK, at least one poly(aryletherketone) different from said PEKK and from 10 to 50 wt % of carbon fibers, with respect to the total weight of the composition, obtained by the method of claim 1.

14. The carbon fiber reinforced poly(aryletherketone) composition of claim 13 wherein:
   the composition in which chips of CF/PEKK composite material, are melt mixed with one or more poly(aryletherketone) polymer are characterised by at least one of the following properties:
      tensile strength equal to or greater than 255 GPa as measured on ASTM Type I dog-bone test specimens (16.5 cm long, 1.3 cm wide and 0.32 cm thick) according to ASTM D638 (test speed: 0.5 cm/min);
      flexural strength equal to or greater than 370 MPa as measured on bars (12.7 cm long, 1.3 cm wide and 0.32 cm thick) according to ASTM D790 (test speed: 0.13 cm/min, 5.1 cm span); or
   the composition in which chips of CF/PEKK composite material, are melt mixed with a composition comprising PEEK, polyphenylsulfone (PPSU) and polyethersulfone (PES) are characterised by at least one of the following properties:
      tensile strength equal to or greater than 160 GPa as measured on ASTM Type I dog-bone test specimens (16.5 cm long, 1.3 cm wide and 0.32 cm thick) according to ASTM D638 (test speed: 0.5 cm/min);
      flexural strength equal to or greater than 235 MPa as measured on bars (12.7 cm long, 1.3 cm wide and 0.32 cm thick) according to ASTM D790 (test speed: 0.13 cm/min, 5.1 cm span).

15. An article comprising the carbon fiber reinforced composition of claim 13.

16. The method of claim 1 wherein the chips have a length comprised in the range of 5 to 20 mm.

17. The method of claim 1 wherein the carbon fibers have an average length ranging from 0.05 to 10 mm.

18. The method of claim 1 wherein the providing chips comprises a step of chopping or cutting to produce the chips.

* * * * *